(12) United States Patent
Kravets (10) Patent No.: US 9,436,805 B1
(45) Date of Patent: Sep. 6, 2016

(54) METHOD AND SYSTEM FOR TRANSFER OF SUBSCRIPTION MEDIA

(75) Inventor: Leonid Kravets, Philadelphia, PA (US)

(73) Assignee: PRIME RESEARCH ALLIANCE E, INC. (VG)

( * ) Notice: Subject to any disclaimer, the term of this patent is extended or adjusted under 35 U.S.C. 154(b) by 989 days.

(21) Appl. No.: 12/167,777

(22) Filed: Jul. 3, 2008

(51) Int. Cl.
*G06F 21/00* (2013.01)
*G06F 21/10* (2013.01)

(52) U.S. Cl.
CPC ................................ *G06F 21/10* (2013.01)

(58) Field of Classification Search
CPC ..................................................... G06F 21/00
USPC ........................................................ 705/59
See application file for complete search history.

(56) References Cited

U.S. PATENT DOCUMENTS

| | | | |
|---|---|---|---|
| 6,088,450 A | 7/2000 | Davis et al. | |
| 7,027,460 B2 | 4/2006 | Iyer et al. | |
| 7,219,153 B1 | 5/2007 | Day | |
| 7,444,413 B2 | 10/2008 | Saxena | |
| 7,676,823 B2 | 3/2010 | Acharya et al. | |
| 7,881,656 B2 | 2/2011 | Khedouri et al. | |
| 7,895,445 B1 | 2/2011 | Albanese et al. | |
| 2002/0152465 A1 | 10/2002 | Khoo et al. | |
| 2003/0023561 A1* | 1/2003 | Stefik et al. | 705/51 |
| 2003/0097655 A1* | 5/2003 | Novak | G06Q 20/3821 725/31 |
| 2003/0115038 A1 | 6/2003 | Want et al. | |
| 2003/0174243 A1 | 9/2003 | Arbeiter et al. | |
| 2004/0116118 A1 | 6/2004 | Karaoguz et al. | |
| 2005/0155077 A1* | 7/2005 | Lawrence | H04N 21/4113 725/109 |
| 2005/0232284 A1 | 10/2005 | Karaoguz et al. | |
| 2005/0239445 A1 | 10/2005 | Karaoguz et al. | |
| 2006/0206486 A1* | 9/2006 | Strickland | G06Q 10/10 |
| 2006/0259927 A1 | 11/2006 | Acharya et al. | |
| 2007/0038567 A1 | 2/2007 | Allaire et al. | |
| 2007/0038931 A1 | 2/2007 | Allaire et al. | |
| 2007/0086372 A1 | 4/2007 | Lee et al. | |
| 2007/0219856 A1 | 9/2007 | Ahmad-Taylor | |
| 2007/0250845 A1 | 10/2007 | Walter et al. | |
| 2007/0250880 A1 | 10/2007 | Hainline | |
| 2008/0010372 A1 | 1/2008 | Khedouri et al. | |

(Continued)

FOREIGN PATENT DOCUMENTS

WO     WO 2005004372 A2 *  1/2005 ......... H04L 67/1095

OTHER PUBLICATIONS

Markantonakis, Konstantinos et al. "Enhancing the Conditional Access Module Security in Light of Smart Card Sharing Attacks," Presentation, Information Security Group Smart Card Centre, Royal Holloway, University of London. Accessed at <http://www.geocities.com/mike.tunstall/presentation/EnhancingtheConditionalAccessModule.pdf> on Oct. 20, 2008.

(Continued)

*Primary Examiner* — James A Reagan
(74) *Attorney, Agent, or Firm* — The Belles Group, P.C.

(57) ABSTRACT

A method of receiving media content at a networked media viewing device at a first location includes transmitting, to an entity associated with a central authority, a request to purchase a temporary access license. A request to establish a connection with a source device at a second location capable of transmitting media content to the first location is transmitted to the central authority. Content is received at the networked media viewing device at the first location via a content link established with the source device at the second location.

30 Claims, 7 Drawing Sheets

(56) References Cited

U.S. PATENT DOCUMENTS

| | | |
|---|---|---|
| 2008/0052509 A1* | 2/2008 | Ahmed .................. H04L 63/02 713/156 |
| 2008/0060043 A1 | 3/2008 | Malik |
| 2008/0060065 A1 | 3/2008 | Wynn et al. |
| 2008/0160908 A1 | 7/2008 | Khedouri et al. |
| 2008/0160909 A1 | 7/2008 | Khedouri et al. |
| 2008/0160910 A1 | 7/2008 | Khedouri et al. |
| 2008/0162655 A1 | 7/2008 | Khedouri et al. |
| 2008/0163302 A1 | 7/2008 | Khedouri et al. |
| 2008/0175566 A1 | 7/2008 | Khedouri et al. |
| 2008/0180401 A1 | 7/2008 | Khedouri et al. |
| 2008/0182508 A1 | 7/2008 | Khedouri et al. |
| 2008/0182509 A1 | 7/2008 | Khedouri et al. |
| 2008/0182510 A1 | 7/2008 | Khedouri et al. |
| 2008/0183840 A1 | 7/2008 | Khedouri et al. |
| 2008/0184317 A1 | 7/2008 | Khedouri et al. |
| 2008/0184359 A1 | 7/2008 | Khedouri et al. |
| 2008/0187115 A1 | 8/2008 | Khedouri et al. |
| 2008/0189295 A1 | 8/2008 | Khedouri et al. |
| 2009/0069915 A1 | 3/2009 | Khedouri et al. |

OTHER PUBLICATIONS

Tunstall, Michael et al. "Inhibiting Card Sharing Attacks," Lecture Notes in Computer Science: Advances in Information and Computer Security, vol. 4266, pp. 239-251.

Annapureddy, Siddhartha, et al. "Exploring VoD in P2P Swarming Systems," Proceedings of the IEEE International Conference on Computer Communications ( InfoCom '07 ) Minisymposium. Accessed at <http://www.scs.stanford.edu/~reddy/research/redcarpet/redcarpet-infocom07.pdf> on Oct. 20, 2008.

Suh, Kyoungwon, et al. "Push-to-Peer Video-on-Demand system: design and evaluation," IEEE Journal on Selected Areas in Communications. Dec. 2007, vol. 25, Iss. 9, pp. 1706-1716.

Sato, Katsuhiko, et al. "Peer-to-Peer Based Mobile Video On-Demand with Layered Video Distribution," Proceedings of the First International Conference on Complex, Intelligent and Software Intensive Systems (CISIS 2007). Apr. 10-12, 2007, pp. 119-126.

Chan, Chen-Lung, et al. "Peer-to-peer video delivery scheme for large scale video-on-demand applications," Proceedings of the 2004 IEEE International Conference on Multimedia and Expo (ICME). Jun. 27-30, 2004, pp. 1043-1046.

\* cited by examiner

METHOD AND SYSTEM FOR TRANSFER OF SUBSCRIPTION MEDIA

CROSS REFERENCE TO RELATED APPLICATION

This application is related to U.S. patent application Ser. No. 12/167,768, filed Jul. 3, 2008, and entitled Method and System for Transfer of Subscription Media, U.S. patent application Ser. No. 12/167,783, filed Jul. 3, 2008, and entitled Method and System for Transfer of Subscription Media, and U.S. patent application Ser. No. 12/167,789, filed Jul. 3, 2008, and entitled Method and System for Transfer of Subscription Media, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Certain terminology is used herein for convenience only and is not to be taken as a limitation on the embodiments of the present invention. In the drawings, the same reference letters and/or numerals are employed for designating the same elements throughout the several figures. The words "right", "left", "lower" and "upper" designate directions in the drawings to which reference is made. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

As the rate of adoption of Internet media and IP television (IPTV) technology grows, it is likely that traditional subscription based cable and satellite services will suffer losses in their subscriber bases. As a result, when attempting to view or retrieve content, these households or locations may be unable to access the traditional subscription based networks without first having the connection physically activated. Therefore, a system and method for allowing non-subscribing households to temporarily connect to a traditional provider are described.

The ability of non-subscribing households to temporarily connect to traditional subscription-based networks or providers are enhanced by the adoption of Personal Video Recorders (PVRs) and streaming media systems, which allow for content to be stored locally or accessed via another network. Although the present system is not constrained to the use of PVRs or streaming media connections, those technologies can be used in various embodiments to enhance the ability of the consumer to access the subscription media content.

Referring to the drawings in detail, wherein like numerals indicate like elements throughout, there is shown in FIGS. 1-7 various embodiments of the present invention, depicting a system for transferring subscription media content between distinct locations.

Figure 1:
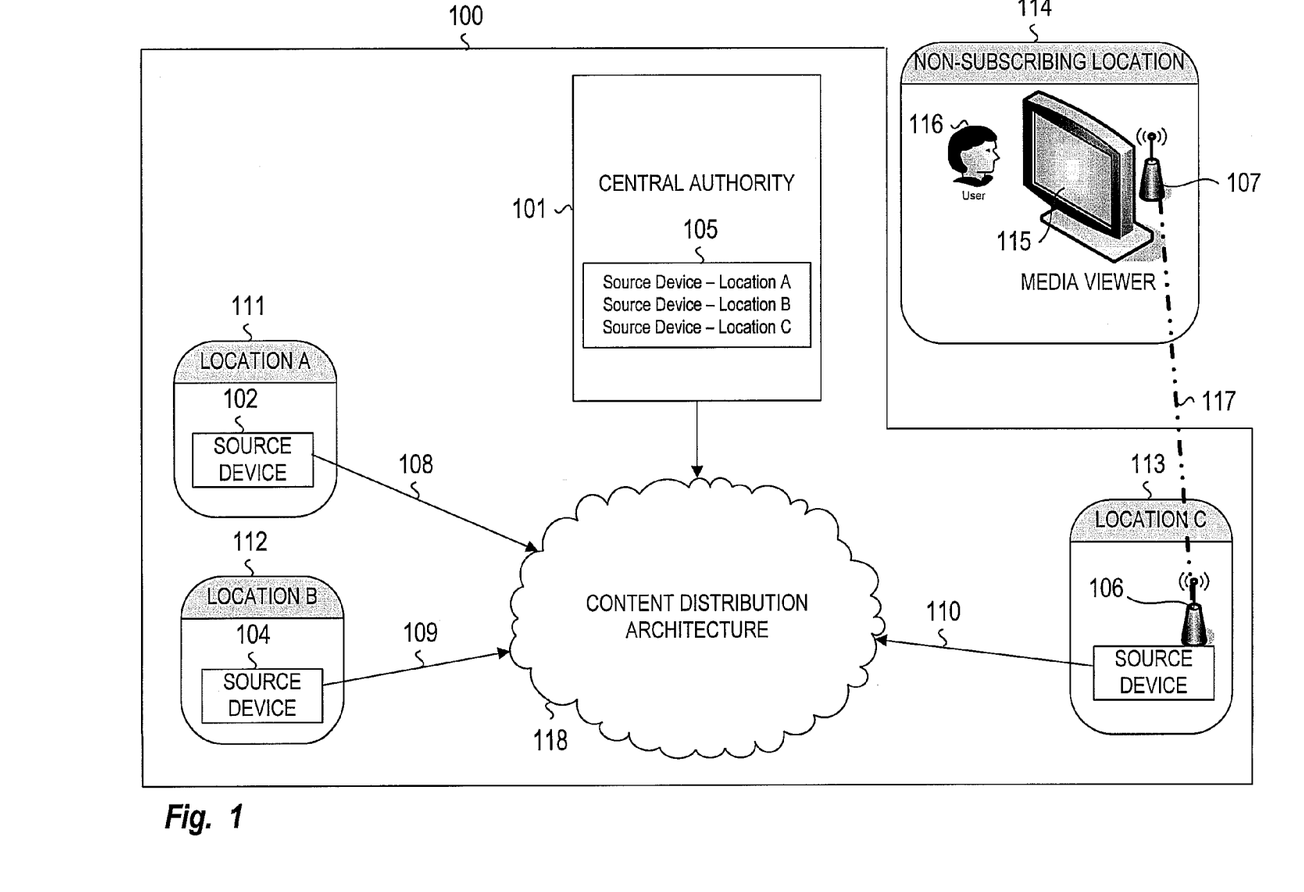
FIG. 1 is a representation of a non-subscribing location attempting to connect to a source device connected to a traditional service provider.

FIG. 1 is a representation of a system architecture of a non-subscribing location 114 connecting to a source device 103 in a traditional subscription-based network 100. The traditional subscription-based network 100 includes subscribing locations 111, 112, 113. A traditional subscription-based network may include one or more clients configured to receive subscription content from a content distributor (e.g., cable service, satellite service, or similar subscription based networks or distribution systems). Temporary access to subscription content for the non-subscribing location 114 to a traditional subscription-based network 100 may be granted by creating a network connection with a proximate subscribing location 113 via a temporary wireless connection 117. Note that while a temporary wireless connection is demonstrated, this connection may be only partially wireless, for example, where a wireless router is connected to a cable Internet connection. The traditional subscription-based network 100 includes a central authority 101, content distribution architecture 118 and subscriber locations demonstrated by subscribing location A 111, subscribing location B 112 and subscribing location C 113. Content distribution architecture 118 may include various distribution elements such as head ends, central offices and the Internet. Central authority 101, which manages all connections to the traditional network, is connected to content distribution architecture 118. Subscribing location A 111 has a networked source device 102 connected to the content distribution architecture 118 via a content link 108. Subscribing location B has a source device 104 connected to the content distribution architecture 118 via a content link 109. Subscribing location C has a source device 103 connected to the content distribution architecture 118 via content link 110. The source device 103 has a wireless network adapter 106. A source device may be any device capable of receiving and sending content provided by the traditional provider, including, but not limited to set-top boxes and CableCard enabled televisions. A content link may be any wired or wireless connection between a source device and the content distribution architecture, including, but not limited to: coaxial cable, digital broadcast satellite link, fiber to the node (FTTN) and fiber to the home (FTTH). Central authority 101 may contain a database of location information 105 for each of the source devices 102, 103 and 104 that may be used to facilitate a temporary connection with a networked media viewing device 115 at a non-subscribing location 114.

In various embodiments, the temporary wireless connection 117 may be managed by the central authority 101. The central authority 101 may be controlled by a single traditional subscription provider (e.g. cable network), by multiple traditional providers (e.g. Comcast and Road Runner), or by a combination of traditional subscription-based services and alternate content providers or services (e.g. cable network and Internet video provider or distributor). In one embodiment, the networked media viewing device 115 at the non-subscriber's location 114 may send and receive content via a wireless network adapter 107. The networked media viewing device 115 may include a single display such as a television or may comprise a display device and an additional device (not shown) coupled to the display device. The additional device may be, but is not limited to a game console, a personal video recorder (PVR), a set-top box (STB), a remote control, a cell phone, a personal digital assistant (PDA), a router or a computer.

The temporary connection process may be initiated when a viewer at the non-subscribing location 114 purchases a temporary access license to the traditional provider's network 100. The purchase may be made through a website or through various means for communicating with the central authority 101, including a native graphical user interface, a telephone session, an interface on a STB, etc. The purchase may be for a specific amount of time, a specific programming network and/or for a particular title of programming. The traditional provider may require immediate payment from the non-subscriber or may bill the non-subscriber later. The central authority 101 may facilitate the purchase by the non-subscriber or alternatively may receive purchase details from a sales server associated with the traditional provider.

Figure 2:
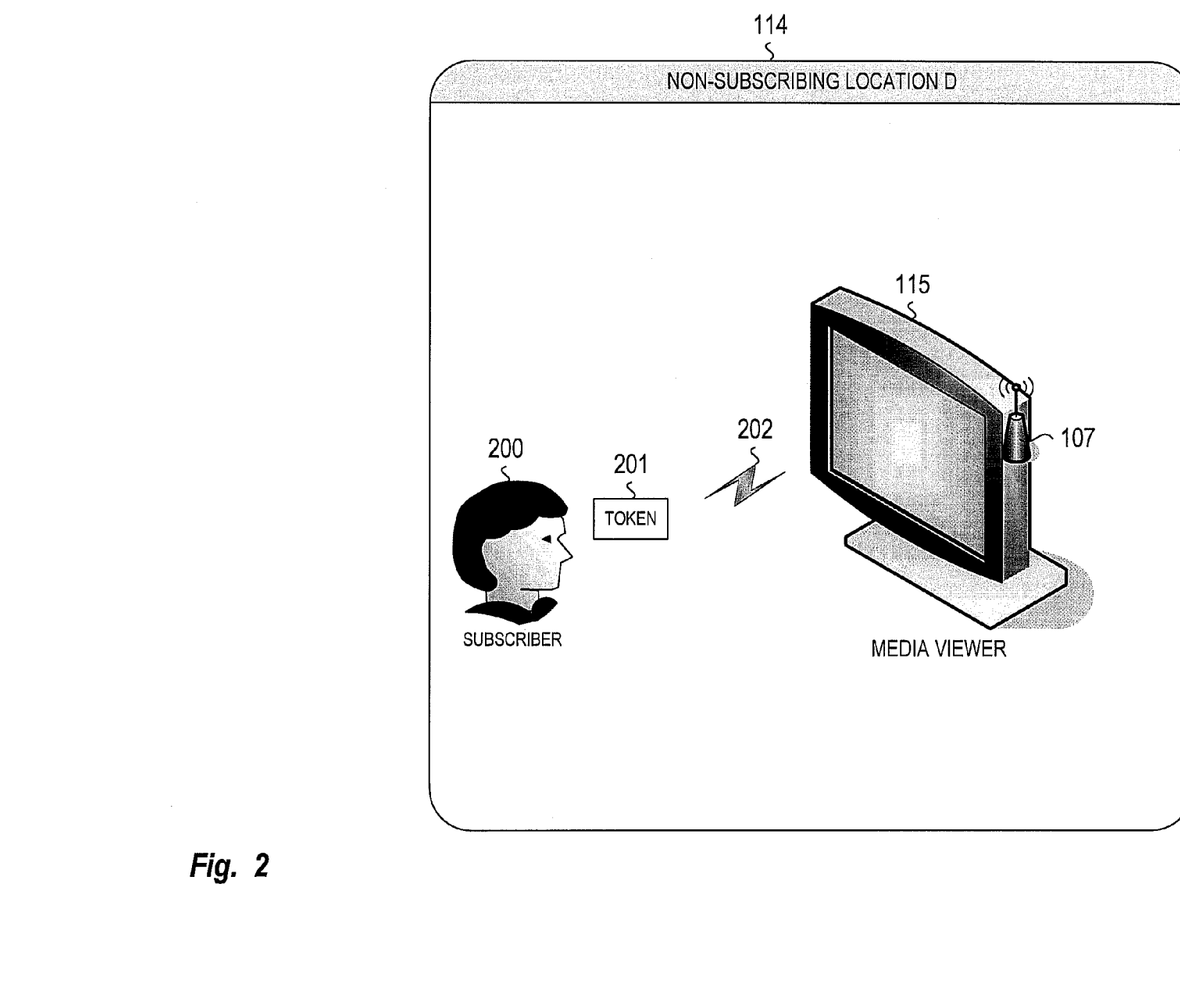
FIG. 2 demonstrates a roaming profile token connected with a media viewing device at a non-subscriber's location.

Referring to FIG. 2, in another embodiment, the temporary connection process may be initiated when a subscriber 200 with a roaming profile token 201 provides the roaming profile token 201 from the non-subscriber's location 114. The roaming profile token 201 may be an account number, a key fob, a smartcard or alternatively may be data embedded in a device such as cell phone or USB key. One skilled in the art would recognize that other devices may be used as a roaming profile token 201. The roaming profile token 201 may be issued to the subscriber 200 by a traditional provider as a benefit of having a subscription plan or may be a purchased account add-on. Each roaming profile token 201 allows the subscriber 200 to initiate a temporary viewing session with the subscriber's provider from a second location. The second location may be that of a non-subscriber or a different subscriber with a more restrictive subscription plan. The roaming profile token 201 provided by the subscriber 200 is activated by coupling it to a networked media viewing device 115, thereby creating a token link 202.

The token link 202 may be created by inputting an account number of the roaming profile token 201 into a graphical user interface associated with the networked media viewing device 115. Alternatively, the token link 202 may be created by pairing the roaming profile token 201 with the networked media viewing device. The pairing may be performed via a short-range wireless protocol such as Bluetooth or through a physical interface such as universal serial bus (USB) or a docking station. In a physical interface embodiment, the remote profile token 201 may be plugged in, thus requiring a port on the remote profile token 201 or a port on a device in which the remote profile token 201 is stored. In an alternative embodiment, a wireless pairing process may be used to establish the token link 202.

Figure 3:
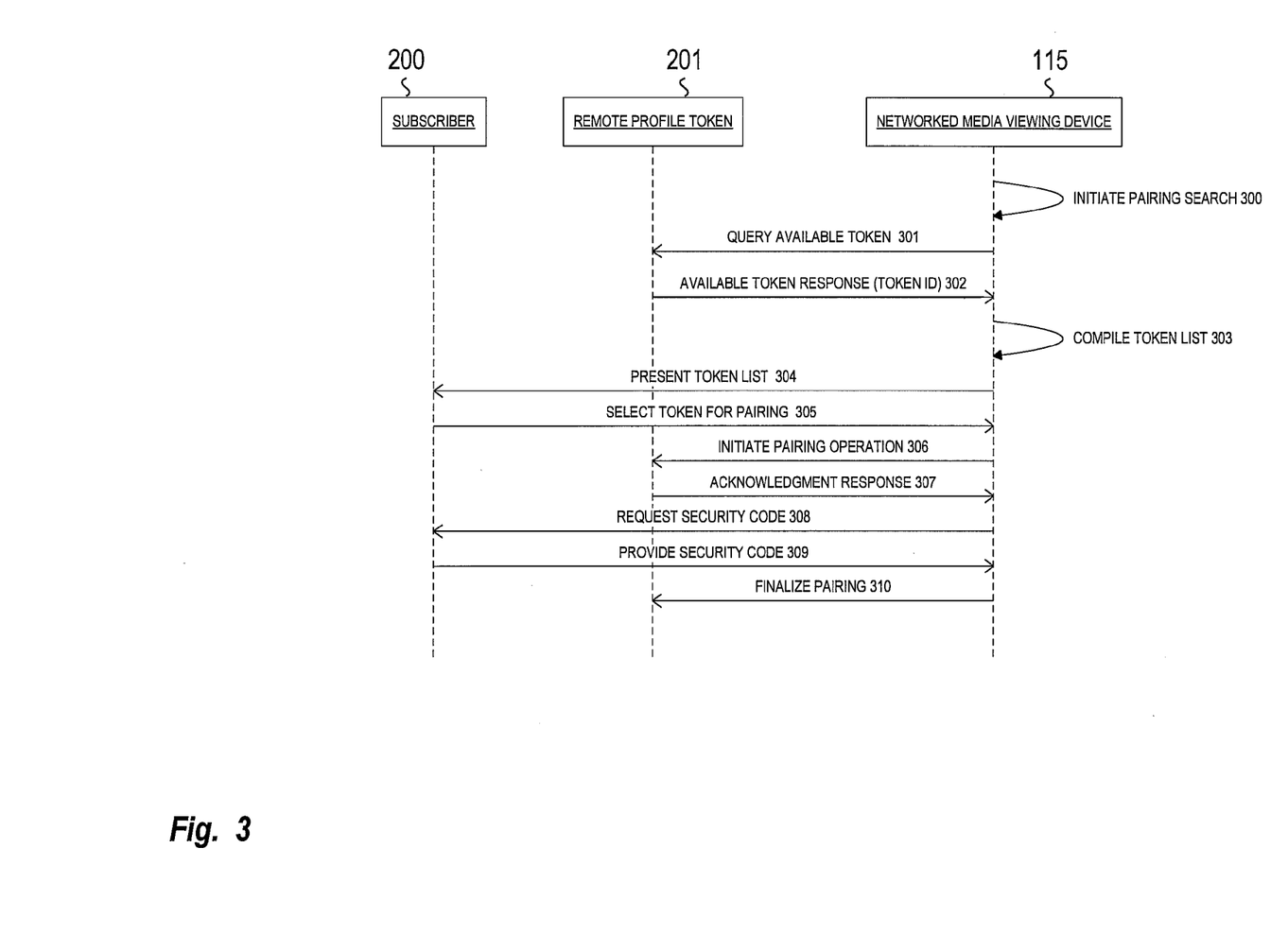
FIG. 3 is a sequence diagram showing the pairing process of a roaming profile token to a networked media viewing device.

Referring to FIG. 3, to initiate a wireless pairing process, the networked media viewing device 115 may search for available roaming profile tokens by issuing a query available token command 301. Available roaming profile token 201 may transmit an available token response 302 to the networked media viewing device 115, the response containing a token identification. Once the search is completed, the networked media viewing device 115 compiles an available token list 303. The list may display information about the roaming profile token 201 such as subscribed premium channels. If more than one roaming profile token is available, the subscriber 200 is presented a list 304 of roaming profile tokens to select from for pairing. The subscriber 200 may review and select a roaming profile token for pairing 305. Once the networked media viewing device 115 receives the selection, it may initiate a pairing operation 306 with the roaming profile token 201. The roaming profile token 201 may optionally send an acknowledgement response 307 to the initiation of the pairing operation 306. In one embodiment, a security code may be requested 308 from the subscriber 200 prior to completion of the pairing process to prevent fraud. Upon successfully entering the security code 309, the roaming profile token pairing process may be completed 310. As an example, if two subscribers with distinct roaming profile tokens visit the non-subscriber's location to watch a show, the networked media viewing device 115 may query each of the subscriber's roaming profile tokens and present a list of both tokes to allow selection of one token for pairing.

Figure 4:
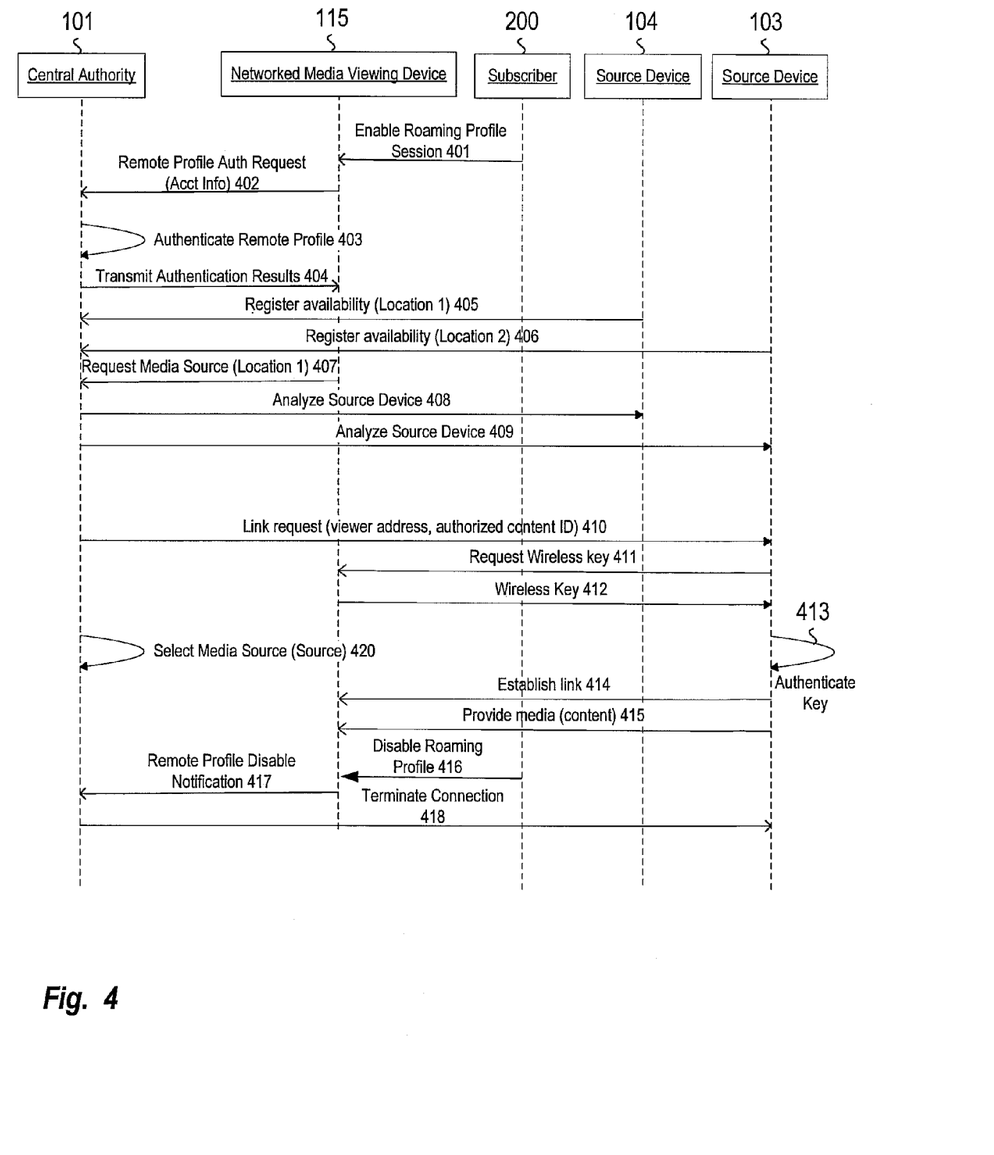
FIG. 4 is a sequence diagram describing the process for connecting a non-subscriber with a subscriber via a central authority.

Referring to FIG. 4, an exemplary method of establishing a roaming profile session is described. The subscriber 200 requests to initiate the roaming profile session 401 by pairing the roaming profile token 201 with the networked media viewing device 115. Once the roaming profile toke 201 has been paired, the networked media viewing device 115 may contact the central authority 101 by sending a roaming profile authentication request 402. The roaming profile authentication request 402 includes account information associated with the roaming profile token 201. The central authority 101 authenticates the request by performing account verification 403. Once the central authority 101 has authenticated the authentication request 402, the central authority 101 sends an authentication result message 404 to the networked media viewing device 115.

Upon successful authentication of the roaming profile session 401 by the central authority 101, the central authority 101 may begin locating a source device to facilitate a temporary network connection with networked media viewing device 115. In one embodiment, the central authority 101 selects a source device based on its proximity to the networked media viewing device 115. Proximity may be determined based at least in part on a physical address, IP address, postal code, zip code, latitude/longitude coordinates or GPS coordinates. One skilled in the art would recognize that other techniques for determining proximity could be used. In order to select the source device, the central authority 101 may be provided with or may determine the physical location of the networked media viewing device 115 at the non-subscribing location 114. The physical location may be transmitted to the central authority 101 or alternatively may be determined from the IP address associated with the networked media viewing device 115.

If the central authority 101 is responsible for locating the source device, the central authority 101 may perform an evaluation of any or all registered source devices. Still referring to FIG. 4, in one embodiment, each source device may automatically register with the central authority 101 upon activation. Source device 104 registers with the central authority 101 by sending a register availability message 405. Source device 103 registers with the central authority 101 by sending a register availability message 406. Optionally, the source devices 103 and 104 may request permission to register with the central authority 101 from their respective users. In order to determine network status, the central authority 101 may transmit an analyze source device message 408 to candidate source device 104 and an analyze source device message 409 to candidate source device 103. As part of the evaluation, the central authority 101 may determine that a candidate source device is capable of maintaining a network connection with the networked media viewing device 115 via a wired or wireless network connection. If there are multiple candidate source devices, the central authority 101 may take into consideration network characteristics such as available uplink spots and bandwidth in selecting the appropriate source device. One skilled in the art would recognize other network characteristics that may be used in selecting a source device. The central authority 101 may also take into consideration proximity of the candidate source device to non-subscribing location 114 and signal strength between the candidate source device and the non-subscribing networked media viewing device 115.

Alternatively, the networked media viewing device 115 may perform a scan to locate source devices within connection range and provide the identifier of one or more such devices to the central authority 101. The central authority 101 may use the list provided by networked media viewing device 115 as the candidate list for selecting an appropriate source device. In this embodiment, the central authority 101 need not determine the location of the networked media viewing device 115. However, central authority 101 may perform a further network analysis in order to identify additional candidate source devices if it determines that the list provided by networked media viewing device 115 is insufficient.

Once the central authority 101 receives a media source request message 407 from the networked media viewing device 115, it may perform a select source device operation 420. The central authority 101 may select source device 103 based at least in part on its proximity to the networked media viewing device 115. The central authority 101 may communicate the address of the networked media viewing device 115 to the selected source device 103 via a link request message 410. The link request message 410 includes the address of the networked media viewing device 115 and content permissions. Alternatively, the central authority 101 may communicate the address of the selected source device 103 to the networked media viewing device 115. A network connection 411 may be established between the source device 103 and the networked media viewing device 115 using the provided address information. In one embodiment, the link is wireless, and may use a Wi-Fi or WiMAX protocol for communications. Alternatively, a link may be established over a Local Area Network (LAN), Municipal Area Network (MAN) or over the Internet.

In a wireless embodiment, the central authority 101 may create a wireless key to be transmitted along with the address information. Alternatively, the central authority 101 may activate a wireless key stored on the roaming profile token 201 paired with the non-subscriber's networked media viewing device 115 or allow the selected source device 103 to create the key. The wireless key may be used to secure the link between the devices and may expire at a predetermined time in order to prevent continued use. To receive a wireless key, the source device 103 may send a request wireless key message 411 to the networked media viewing device 115. Networked media viewing device 115 may transmit a wireless key message 412. Upon proper authentication 413 of the wireless key, a network connection 414 may be established between the source device 103 and the networked media viewing device 115.

Once a network connection is established, the link may be used to provide media content messages 415 from the source device 103 directly to the networked media viewing device 115. The central authority 101 may control the content that is transmitted to the networked media viewing device 115 based on the content ordered by the non-subscriber or the permissions of the roaming profile token 201. Alternatively, the central authority 101 may provide the content control information to the source device 103. Using this information, the source device 103 may control the content transmitted to the networked media viewing device 115. In order to prevent unauthorized viewing of content, various digital rights management (DRM) techniques known in the art may be employed.

The DRM scheme may be pre-set by the central authority 101 or may be negotiated between a selected source device and the networked media viewing device 115. In one embodiment, content may be encrypted using public key cryptography. In this scheme, each networked device may have a private key and a public key. Once a network connection has been established between a selected source device and the networked media viewing device 115, the devices may exchange public keys. The public key of networked media viewing device 115 may be used by the source device to encrypt content prior to transmitting it to the networked media viewing device 115. Upon receipt of the encrypted media, the networked media viewing device 115 may decrypt the content using its private key and present it to the viewer. In alternate embodiments, other cryptography methods understood by one skilled in the art could be employed.

Encrypted content may be used in order to preload a personal video recorder (PVR) of a networked media viewing device 115 prior to the establishment of a roaming profile session 401. In this embodiment, the networked media viewing device 115 of a non-subscriber may receive encrypted content from a source device physically connected to the traditional subscription-based network 100. The content may be downloaded to the networked media viewing device 115 in anticipation of a roaming profile token 201 being provided to the networked media viewing device 115. Content may be preloaded based on non-subscriber's viewing habits and would allow for targeted advertisements to be inserted into the provided content. Preloading may be based on a subscriber's request, on a non-subscriber's request, on recommendations provided by other viewers, or on recommendations based on analysis of non-subscriber's viewing history from previous temporary connections to the traditional subscription-based network 100. One skilled in the art would recognize other criteria that may be used for preloading content to a non-subscriber. The central authority 101 may determine whether a candidate source device capable of connecting with the networked media viewing device 115 has received the content to be preloaded. If the candidate source device contains the content to be preloaded, the central authority 101 may facilitate establishing a connection between the candidate source device and networked media viewing device 115 for preloading the content. Once a remote profile token 201 has been provided to networked media viewing device 115, an encryption key may be provided from the central authority 101.

In another embodiment, the central authority 101 may determine additional source devices capable of connecting with the networked media viewing device 115. Portions of content may be transmitted to the networked media viewing device 115 from each source device to minimize network strain. The BitTorrent communications protocol may be used to implement such a transfer scheme. The central authority 101 may act as the BitTorrent tracker. When a new source device become available, the central authority 101 may facilitate additional connections with the networked media viewing device 115. The central authority 101 may also swap source devices based on network availability and performance. The central authority 101 may request a source device swap when it determines that a newly available source device may provide a better connection to the networked media viewing device 115 or if the selected source device is needed to provide content to a second networked media viewing device at a second non-subscribing location.

Referring to FIG. 4, presentation of content may be terminated upon determining that the purchased allotment of time or content has been viewed. The subscriber 200 may initiate a disable roaming profile message 416. The networked media viewing device 115 may transmit a roaming profile disable notification 417 to central authority 101. Upon receipt, the central authority 101 may send a terminate connection command 418 to the source device 103. Alternatively, the central authority 101 may provide termination instructions to source device 103 along with the link request message 410. In this embodiment, the source device 103 is responsible for determining when to terminate the connection with the networked media viewing device 115. When a determination to terminate is made, the source device 103 can discontinue sending content to the networked media viewing device 115 and may break the established network connection. If required by the central authority 101, the wireless key and/or encryption keys may be destroyed or modified to prevent future use.

Alternatively, termination of the connection between source device 103 and networked media viewing device 115 may come as a result of the roaming profile token 201 being unpaired from the networked media viewing device 115. The central authority 101 may periodically query the roaming profile token 201 for a response. When no response is received, the central authority 101 may assume the roaming profile token 201 has been unpaired. Alternatively, the networked media viewing device 115 may send a termination signal 417 to the central authority 101 or to the source device 103 upon being unpaired from the roaming profile token 201.

Figure 5:
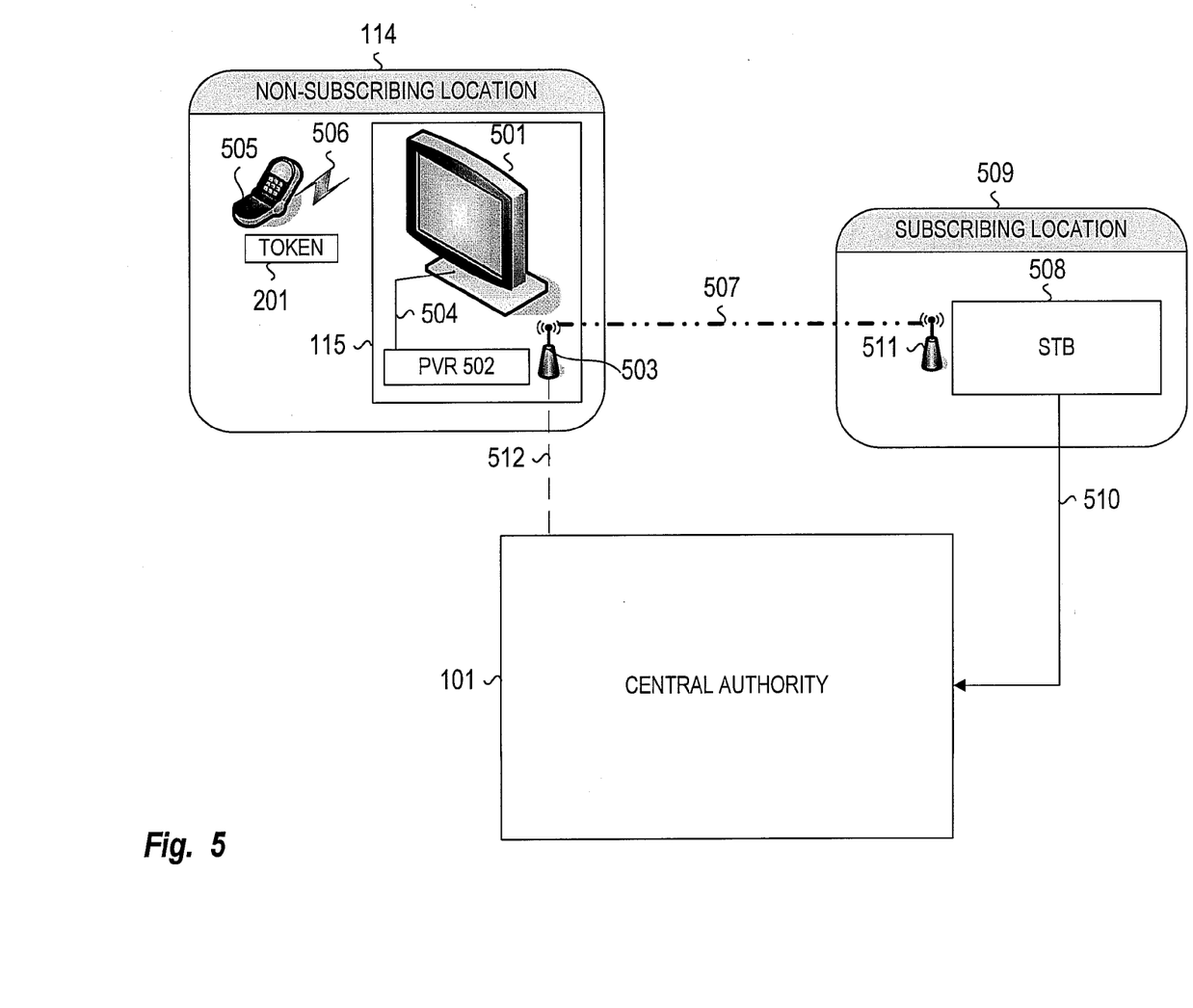
FIG. 5 is a representation of a central authority facilitating a connection between the media viewing device and the source device.

Referring to FIG. 5, an example of a system having a personal video recorder at the non-subscriber location 114 is described. The non-subscribing location 114 contains a networked media viewing device 115 including a personal video recorder (PVR) 502 connected to a high-definition television (HDTV) 501. The PVR has a Wi-Fi wireless network adapter 503, a USB port (not shown) and an HDMI output (not shown). The PVR 502 is connected to the HDTV 501 via an HDMI cable 504. A roaming profile token 201 contained in a cell phone 505 may be connected to the PVR via a Bluetooth connection 506. The PVR 502 may read the roaming profile token 201 stored in the cell phone 505 and temporarily download to storage on the PVR 502 the affiliated subscriber's account information and a graphical user interface for communicating with the central authority 101 and a selected source device.

In one exemplary scenario, the central authority 101 is operated by a cable provider (e.g., Comcast). The cable provider distributes a STB to each subscriber. The cable provider may also distribute the roaming profile token 201. Location C 113 has an STB 103 with built-in wireless adapter 106 capable of communicating using the Wi-Fi 802.11n protocol. The STB 103 provides the subscriber with an electronic program guide (EPG) that controls access to television content. In the cable television paradigm, digital content may be transmitted to the STB in the form of transport streams. The STB decodes the transport streams, determining what channels the subscriber is able to view. The subscriber may view a channel by selecting it from the EPG or by directly entering a channel number.

In the present example, the central authority 101 facilitates an 802.11n wireless network connection between the non-subscriber's PVR 502 and the subscriber's STB 103. In order to begin the connection process, a subscriber's roaming profile token 201 stored in cell phone 505 must be paired with the PVR 502 by initiating and completing a Bluetooth pairing process. Once paired, the PVR 502 recognizes the roaming profile token 201 stored in cell phone 505 and queries the user to enter the pairing password. The key pad of the cell phone 505, a remote control or a touch screen may be used to provide the password. Once paired, the roaming profile token 201 provides the PVR 502 with an address for the cable provider's central authority 101. The PVR 502 uses the wireless network adapter 503 to create a temporary roaming profile connection 512 to the central authority 101 over the Internet using the provided address. Note that the temporary roaming profile connection 512 may be either wired or wireless or a combination of both, for example where a wireless router is connected to a cable Internet connection.

Once connected, the PVR 502 provides the subscriber's account information to the central authority 101. The central authority 101 may authenticate the roaming profile token 201 and determine subscriber account information such as available premium channels. Once the central authority 101 has verified that the roaming profile token 201 is valid, a source device must be located. The PVR 502 may perform a wireless network search to locate wireless-enabled STBs within connection range. The list of available STBs, containing STB 508 at subscribing location 509, is compiled and provided by the PVR 502 to the central authority 101.

The central authority 101 analyzes the STBs in the provided list to select an STB based on the current availability and network usage statistics. The central authority 101 may require connection tests to be performed between the STBs and PVR to determine an STB capable of maintaining a connection with sufficient bandwidth. If an STB having sufficient bandwidth is located, a one-to-one connection may be initiated between the STB and PVR 502. In this paradigm, the central authority 101 simply facilitates and controls the connection 507, leaving the data transfer duties to the STB.

When the STB 508 is the only device capable of facilitating a connection with networked media viewing device 115 at non-subscribing location 114, central authority 101 may select STB 508 and begin initiating the connection. STB 508 is connected to central authority 101 via a subscriber connection 510. STB 508 has a wireless network adapter 511 capable of communicating using the Wi-Fi 802.11n protocol. Central authority 101 may communicate a connection address and wireless key information for selected STB 508 over the Internet connection 512. Using the received information, PVR 502 may initiate a temporary connection 507 with STB 508 through PVR's wireless network adapter 503. Once the temporary connection has been established, STB 508 is able to send and receive content over its wireless network adapter 511.

Figure 6:
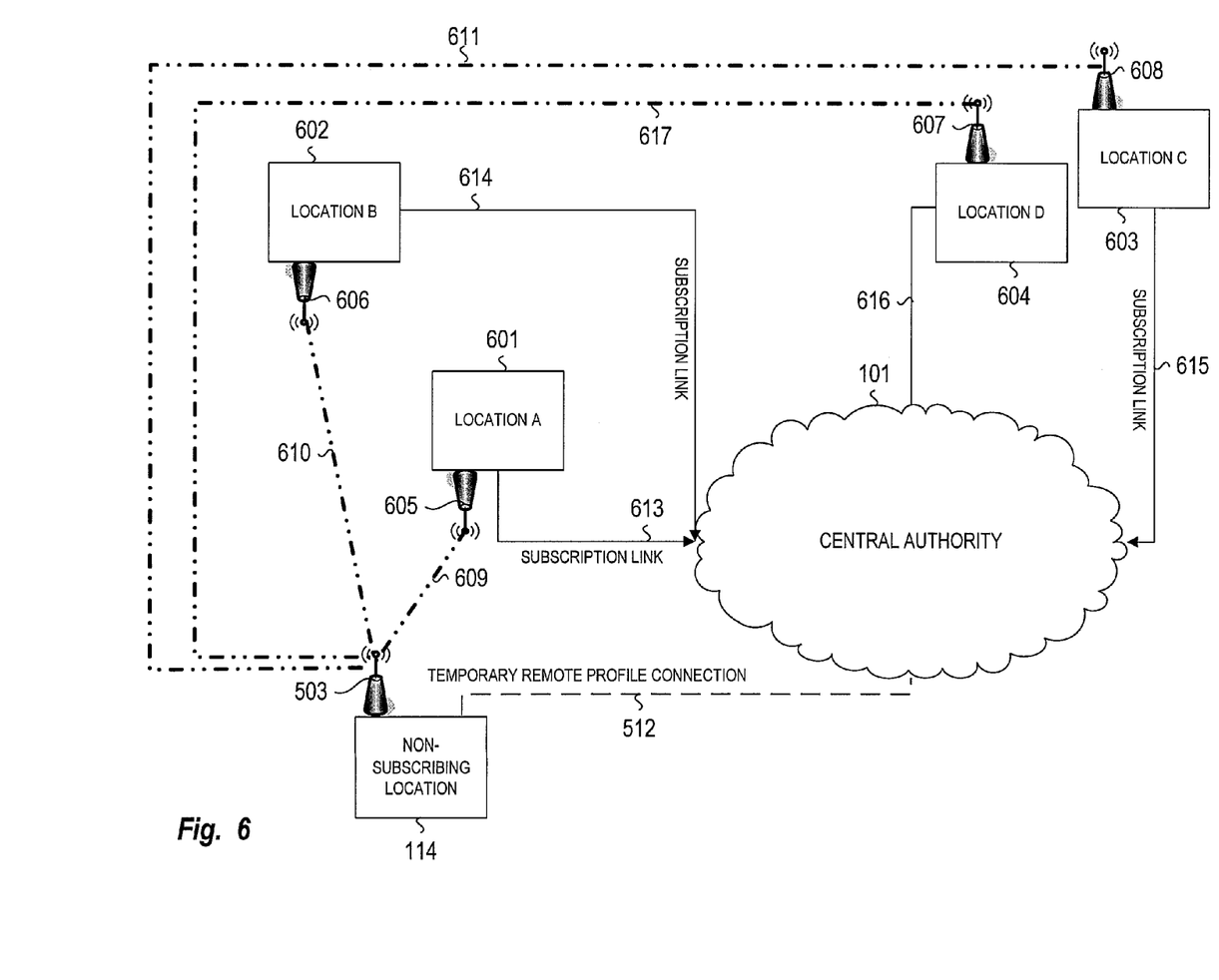
FIG. 6 is an example of multiple subscriber locations providing content to a non-subscribing location.

Referring to FIG. 6, if no single source device is capable of sustaining the required bandwidth for transferring content to networked media viewing device 115, the central authority 101 may select multiple STBs capable of connecting with the non-subscribing location 114. Non-subscribing location 114 may establish a temporary roaming profile connection 512 with central authority 101 over the Internet. Central authority 101 may analyze subscribing location A 601 connected to central authority 101 over subscription link 613, subscribing location B 602, connected to central authority 101 over subscription link 614 and subscribing location C 603 connected to central authority 101 over subscription link 615 in order to determine which location is capable of connecting to non-subscribing location 114. The Bit Torrent protocol may be utilized in sending content from the subscribing locations 601, 602, 603 to the non-subscribing location 114. Note that subscription links 613, 614 and 615 may not be used in sending content to non-subscribing location 114. In managing the transmissions, the central authority 101 may act similarly to a torrent tracker, managing connections between subscribing locations and non-subscribing location 614. Location A 601 may connect to non-subscribing location 114 via temporary link 609 between network interface 605 and wireless network adapter 503. Location B 602 may connect to non-subscribing location 114 via temporary link 610 between network interface 606 and wireless network adapter 503. Location C 603 may connect to non-subscribing location 114 via temporary link 611 between network interface 608 and wireless network adapter 503. Location D 604 may connect to non-subscribing location 114 via temporary link 617 between network interface 607 and wireless network adapter 503.

Each subscribing location may provide content to non-subscribing location 114 over a wireless or wired link. When new subscribing location D 604 is registered with the central authority 101 over subscription link 616, the central authority 101 may reassess and adjust the connections between the one or more subscribing locations 601, 602, 603, 604 and the non-subscribing location 114. Thus, by way of example, subscribing location D 604 may be connected to the non-subscribing location 114 and/or previous connections to subscribing locations 601, 602 and 603 may be terminated.

Figure 7:
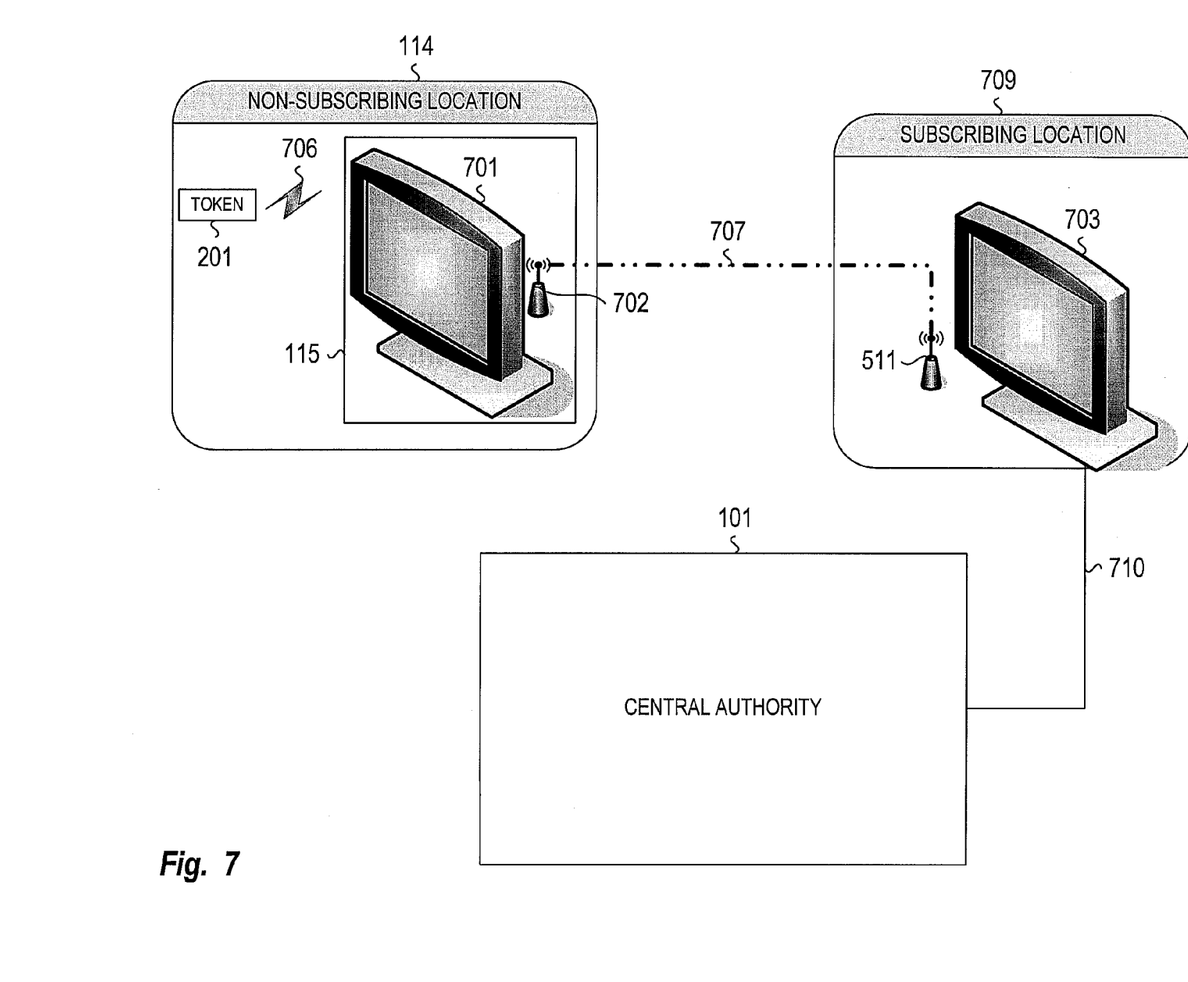
FIG. 7 demonstrates a CableCard enabled television facilitating a non-subscriber's connection to a central authority.

As an additional example, referring to FIG. 7, an HDTV 701 equipped with a wireless adapter 702 may be used as the networked media viewing device 115. The HDTV 701 may be capable of wirelessly connecting to a source device at the subscribing location 709 using a temporary connection link 707. In this example, the source device is a CableCard enabled television 703. CableCard may take the place of a traditional STB, thus all communications are performed through the television. The non-subscriber's HDTV 701 need not be CableCard enabled. A roaming profile token 201 may be paired with the HDTV 701 at the non-subscribing location 114 using the Bluetooth communications protocol 706. Once the pairing is complete, the HDTV 701 may search for proximate Wi-Fi enabled devices. If there is a CableCard enabled television within range of the non-subscriber's HDTV, a temporary connection 707 may be formed.

The temporary connection 707 allows the non-subscriber's HDTV 701 to communicate with the central authority 101 through the subscription link 710 established by the CableCard enabled television 703. This communications scheme eliminates the need for the non-subscriber's HDTV 701 to have Internet access. Once connected with the subscriber's television 703, all communications with the central authority 101 from the non-subscriber could be performed through the subscriber's CableCard enabled connection 710. The preliminary connection 707 may be secure to prevent the HDTV from receiving any subscription-based content prior to authorization by the central authority 101. The rest of the authorization process may be performed in the same way as it would be over the Internet. Once authorization is complete, temporary connection 707 may be used to transfer content from CableCard enabled television 703 to non-subscriber's HDTV 701.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

I claim:

1. A method of receiving media content at a networked media viewing device at a first location, the method comprising:
   (a) transmitting, to an entity associated with a central authority at a third location, a request to purchase a temporary access license, the third location being distinct from the first location;
   (b) providing, by the networked media viewing device, to the central authority a request to establish a connection with the source device at the second location capable of transmitting the media content to the first location, the request to establish the connection comprising identification information for the second location, the second location being distinct from the first location and the third location;
   (c) authorizing and securely establishing a direct connection, by the central authority, between the networked media viewing device and the source device; and
   (d) receiving the media content at the networked media viewing device at the first location via a the source device at the second location, without the media content passing through the central location.

2. The method of claim 1, wherein the transmitting step (a) is performed through a graphical user interface on the networked media viewing device.

3. The method of claim 1, wherein the securely establishing a direct connection comprises implementing a wireless content link between the networked media viewing device and the source device.

4. The method of claim 1, wherein the source device at the second location is selected based on a proximity of the second location to the first location.

5. The method of claim 1, wherein the second location is a household of a subscriber.

6. The method of claim 5, wherein the source device is a set-top box.

7. The method of claim 1, wherein the central authority is operated by a content distributor.

8. The method of claim 7, wherein the content distributor is a traditional provider.

9. The method of claim 1, wherein the receiving the media content further comprises:
   determining whether the temporary access license permits access to the media content by the networked media viewing device at the first location; and
   preventing viewing of the media content at the first location if the temporary access license does not permit access to the content.

10. The method of claim 9, wherein the determining further comprises determining whether the temporary access license has expired.

11. A method of receiving media content at a networked media viewing device at a first location, the method comprising:
   (a) transmitting, by the networked media viewing device to a central authority a request to purchase a temporary access license to access content on the networked media viewing device;
   (b) providing, to the central authority, a request to establish a connection with a set-top box not associated with the networked media viewing device, the request to establish the connection comprising identification information for the set-top box, the set-top box being remote from the networked media viewing device; and
   (c) receiving the media content at the networked media viewing device via a content link established with the set-top box, wherein authorization from the central authority is required to establish the content link and the media content does not pass through the central location.

12. The method of claim 11, wherein the transmitting step (a) is performed through a graphical user interface on the networked media viewing device.

13. The method of claim 11, wherein the content link is a wireless content link.

14. The method of claim 11, wherein the set-top box is selected based on a proximity of the set-top box to the networked media viewing device.

15. The method of claim 11, wherein the central authority is operated by a content distributor.

16. The method of claim 15, wherein the content distributor is a traditional provider.

17. The method of claim 11, wherein the receiving the media content further comprises:
   determining whether the temporary access license permits access to the media content by the networked media viewing device; and
   preventing viewing of the media content at the networked media viewing device if the temporary access license does not permit access to the content.

18. The method of claim 17, wherein the determining further comprises determining whether the temporary access license has expired.

19. A method of receiving media content at a networked media viewing device, the method comprising:
   (a) purchasing, by a first subscriber, a temporary access license for content available on a subscription-based network;
   (b) transmitting, to a central authority of the subscription-based network, a request for access to a source device having subscription content and being located at a location associated with a second subscriber, the source device capable of transmitting the media content to the networked media viewing device at a location different than that of the second subscriber, the request for access comprising identification information for the source device; and
   (c) receiving content from the source device, wherein authorization from the central authority facilitates the connection between the source device and the networked media viewing device, without the media content passing through the central location.

20. The method of claim 19, wherein the purchasing of step (a) is performed through a graphical user interface on the networked media viewing device.

21. The method of claim 19, wherein receiving content step (c) further comprises establishing a wireless content link between the networked media viewing device and the source device.

22. The method of claim 21, wherein the source device is selected based on geographical proximity to the networked media viewing device.

23. The method of claim 19, wherein the location associated with a second subscriber is a household of the second subscriber.

24. The method of claim 23, wherein the source device is a set-top box.

25. The method of claim 19, wherein the central authority is operated by a content distributor.

26. The method of claim 25, wherein the content distributor is a traditional provider.

27. The method of claim 19, wherein the receiving the media content further comprises:
   determining whether the temporary access license permits access to the media content by the networked media viewing device; and
   preventing viewing of the media content at the networked media viewing device if the temporary access license does not permit access to the content.

28. The method of claim 27, wherein the determining further comprises determining whether the temporary access license has expired.

29. A system for presenting media content, wherein a networked media viewing device receives the media content from a content distributor through a source device associated with a subscriber, the system comprising:
   (a) a licensing module configured to obtain a license from an entity associated with the content distributor for viewing requested media content by transmitting a request identifying the source device to the entity associated with the content distributor, the entity associated with the content distributor being at a distinct location from the source device;

(c) a connection module configured to receive pairing information from the central authority and to establish a connection with the source device for receiving the requested media content from the source device based on the received pairing information; and
(d) a storage module configured to store the received media content.

30. An article of manufacture for receiving subscriber content from a content distributor through a source device at a first location associated with a subscriber, the article of manufacture comprising a computer-readable medium holding computer-executable instructions for performing a method comprising:
   (a) transmitting, to an entity associated with a central authority at a third location, a request to purchase a temporary access license;
   (b) providing to the central authority a request to establish a connection with a source device at a second location capable of transmitting the media content to the first location, the request to establish the connection comprising identification information for the second location, the second location being distinct from the first location and the third location;
   (c) securely pairing, by the central authority, the networked media viewing device and the source device; and
   (d) receiving the media content at the networked media viewing device at the first location via a the source device at the second location.

* * * * *